United States Patent
Van Der Aa

[11] 3,774,506
[45] Nov. 27, 1973

[54] DEVICE COMPRISING A LIQUID-SUPPORTED ROLLING DIAPHRAGM SEAL

[76] Inventor: Herman Henricus Maria Van Der Aa, Emmasingel, Eindhoven, Netherlands

[22] Filed: Mar. 29, 1972

[21] Appl. No.: 239,214

[30] Foreign Application Priority Data
Apr. 9, 1971 Netherlands .................... 7104837

[52] U.S. Cl. .................... 92/83, 92/98 D, 417/566
[51] Int. Cl. ........................................... F15b 21/04
[58] Field of Search .................... 92/83, 86, 86.5, 92/98 R, 98 D; 417/566

[56] References Cited
UNITED STATES PATENTS
2,919,718  1/1960  Mercier .................... 92/98 R X
3,401,604  9/1968  Blatt et al. .................... 91/416 X
3,667,349  6/1972  Siebert et al. .................... 92/83
3,699,961  10/1972  Szpur .................... 417/550 X FOREIGN PATENTS OR APPLICATIONS
1,962,245  12/1969  Germany .................... 92/98 RD
1,033,860  12/1964  Great Britain .................... 92/83

Primary Examiner—Martin P. Schwadron
Assistant Examiner—Abe Hershkovitz
Attorney—Frank R. Trifari

[57] ABSTRACT

Apparatus having two relatively reciprocal elements, a rolling diaphragm seal secured between these elements for defining a gas space above the seal and a liquid space below the seal. In the liquid space a portion of one element forms part of a pump and a one-way valve for delivering liquid to said liquid space.

5 Claims, 1 Drawing Figure

PATENTED NOV 27 1973 3,774,506
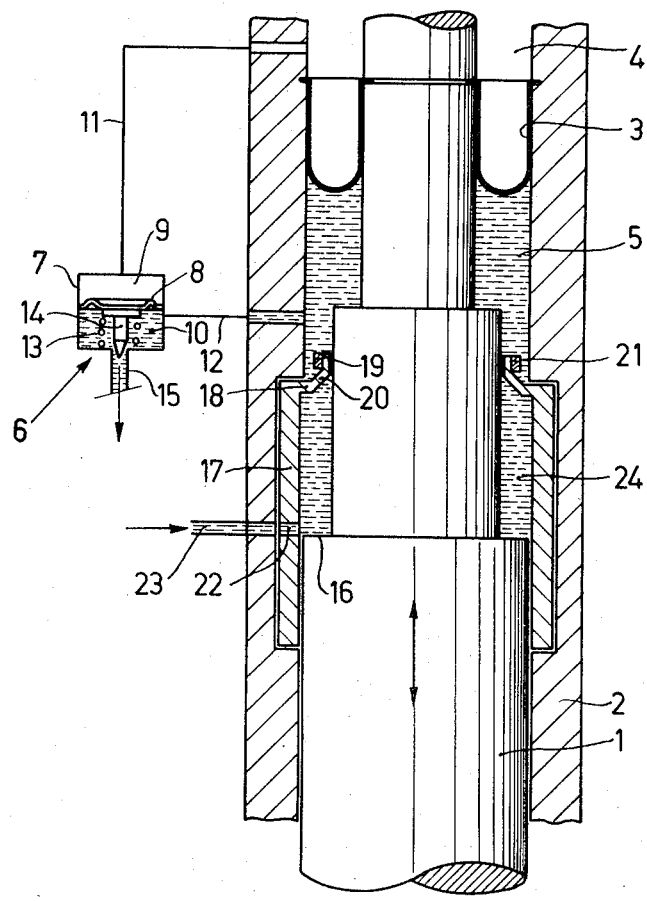

DEVICE COMPRISING A LIQUID-SUPPORTED ROLLING DIAPHRAGM SEAL

BACKGROUND OF THE INVENTION

The invention relates to a device comprising a liquid-supported rolling diaphragm seal between two coaxially arranged relatively reciprocating elements in which liquid pumping means are present for the supply of liquid to a space for the supporting liquid.

A device of the type to which the present invention relates, is known from the U.S. Pat. No. 3,241,379. In this known device, the rolling diaphragm is present between a piston and the cylinder cooperating therewith. The rolling diaphragm separates a working space from a space which is filled with supporting liquid. By means of a so-called pumping ring, liquid is supplied to the said space; a control device is present which ensures always that sufficient liquid is removed from that space that a substantially constant pressure differential is maintained across the rolling diaphragm. The advantage of said rinsing with liquid the space that contains the supporting liquid, is that gas which has diffused into the liquid through the rolling diaphragm is regularly removed with the removed oil so that no bubble formation can occur in the supporting space.

The pumping ring which is described in greater detail in the U.S. Pat. No. 3,149,846 is formed by a metal sleeve which engages with its cylindrical inner side the piston rod, and which is further incorporated in an annular recess in the surrounding housing in such manner that the sleeve cannot move axially. Furthermore, pressure means influence the outer surface on that side of the sleeve to which liquid is pumped, which means force said side of the sleeve against the piston rod. As a result of this, hydrodynamic pressure build-up occurs between the ring and the rod upon movement of the rod, as a result of which a yield of liquid in the direction of the supporting space is obtained. The drawback of the pumping ring is that the yield of liquid, in particular in the case of low number of revolutions, short stroke length and small rod diameter, is too small so that the use of a high pressure oil pump becomes necessary.

SUMMARY OF THE NEW INVENTION

It is the object of the invention to provide a device of the above-mentioned type in which the said drawback is avoided. The device is characterized in that the liquid pumping means are formed by a part of the rod connected to one of the said elements, the rod has a diameter transition and is surrounded by a sleeve-like element having an inner diameter which corresponds to the outer diameter of the part of the rod having the largest diameter. The sleeve comprises at its end surrounding the thinner part of the rod, an annular element which engages the rod with its inner surface and is surrounded by a clamping ring which urges the annular element towards the rod. The sleeve is provided, at a distance from the end supporting the annular element, with at least one aperture which communicates with a liquid supply. In the device according to the invention and with a position of the rod in which the bore in the sleeve-like element is free, liquid is introduced into the space between the rod and the sleeve, which liquid is pressurized upon movement of the rod, the liquid flowing along the annular element into the supporting space. During the return stroke of the rod, the annular element operates as a seal. Without the addition of extra components, a good oil yield with any number of revolutions is ensured with a correct proportioning of the rod and the sleeve-like element. The invention will be described in greater detail with reference to the drawing.

DESCRIPTION OF THE PREFERRED EMBODIMENT

Reference numeral 1 in the drawing denotes a reciprocating rod. This rod may be, for example, the piston rod of a thermodynamic machine or the piston rod of a compressor. The rod 1 is surrounded by a housing 2. A rolling diaphragm 3 is present as a seal in an annular chamber between the housing 2 and the rod 1 and separates the chamber into a space 4 comprising a gaseous medium from a space 5 comprising a supporting liquid for the rolling diaphragm 3. A control element 6 ensures that a constant pressure differential of a few atmospheres is maintained across the rolling diaphragm 3; the control device is illustrated and described in U.S. Pat. No. 3,241,379 referred to on page 1 of this application, specifically FIG. 7 and Cols. 4–5 of this patent. In order to accomplish this object, the control element 6 is constituted by a housing 7 which is divided into two parts 9 and 10 by a diaphragm 8. The part 9 communicates, via a duct 11, with the space 4, the part 10 communicating, via a duct 12, with the space 5 below the rolling diaphragm 3. The diaphragm 8 is under the influence of a compression spring 13 and furthermore comprises a sealing element 14 which can seal or release a liquid outlet 15.

At the area 16 the rod 1 has a stepped construction, a sleeve or sleeve-like element 17 being arranged around said stepped part. The sleeve 17 has an inner diameter which corresponds to the outer diameter of the part of the rod 1 having the largest diameter. At its end 18 surrounding the thinner part of the rod, the sleeve 17 comprises an annular element 19 whose inner surface engages the outer surface of the rod. The annular element 19 is connected to the end 18 of the sleeve 17 by a conical part 20. The outside of the annular element 19 is influenced by a clamping ring 21 which forces the annular element 19 against the rod. The sleeve furthermore comprises an aperture 22 which communicates with a liquid supply 23. During the upward movement of the rod 1, the liquid present in the pumping space 24 between the rod and the sleeve will be pressurized (after step or shoulder 16 has passed aperture 22 in its upward movement), the liquid being capable of flowing between the annular element 19 and the rod to the storage space 5 for the supporting liquid.

During the downward movement of the rod 1, the annular element 19 will be tightly urged against the rod by the clamping ring 21 and thus constitute a seal for liquid present in the space 5 and a partial vacuum in space 24. At the instant the aperture 6 22 is released, i.e. when shoulder 16 descends below aperture 22, liquid will flow from the liquid supply 23 into the space 24 after which, during the following stroke, said liquid can be forced again into the space 5. The liquid supplied to the space 5 will dispppear to the liquid outlet 15 via the control element 6. In this manner a liquid supply pump is obtained with which, by suitable choice of the distance from aperture 22 to the upper side of the sleeve 17, the yield per stroke can be accurately adjusted. The liquid yield will be independent of the speed of the movement of the rod 1 and hence of the number of revolutions of the device of which said rod forms part. In this manner a liquid supply to the space 5 below the rolling diaphragm is obtained with very simple means which ensures a sufficient supply of liquid to the space with any number of revolutions.

I claim:

1. Apparatus operable with a source of liquid comprising a cylinder defining a bore, a piston reciprocally movable in said bore between first and second axial positions, the piston having a first part of first diameter substantially the same as the bore and axially spaced therefrom a second part of second diameter smaller than said bore with an annular chamber defined between the bore and said second part, a rolling diaphragm seal secured between said bore and second part of the piston dividing said chamber into liquid and gas spaces respectively, a sleeve about said piston but axially fixed to the bore in said liquid space and including means dividing same into a pumping space and a storage space and permitting liquid flow only from the pumping space into the storage space, a control device communicating with said gas and storage spaces for maintaining a substantially constant pressure differential across said seal, and duct means for communicating liquid from said source into said pumping space.

2. Apparatus according to claim 1 wherein said piston has a third part intemediate said first and second parts, and said dividing means comprises a one-way valve formed as a flexible sealing ring about and cooperating with said third part, the ring being radially expandable, to permit said liquid flow between the ring and piston, and radially compressible to seal against said piston.

3. Apparatus according to claim 1 wherein said cylinder includes an aperture therethrough for receiving liquid from said source and communicating with said pumping space, and said piston's first part covers and seals said aperture during the initial part of the reciprocal stroke toward said rolling seal, and said first part reciprocally exposes said aperture to permit flow of liquid into said pumping space.

4. Apparatus according to claim 3 wherein said bore has an annular recess, and said sleeve is situated in said recess, the bore of the sleeve coinciding with the bore of the cylinder, said sleeve defining a cylindrical wall with a passage therethrough which passage coincides with said aperture in said cylinder.

5. Apparatus according to claim 1 wherein said piston's first part moves from first to second axial positions in said pumping area, thereby pumping a corresponding quantity of liquid from said pumping area into the storage area, this quantity being generally independent of the speed of reciprocation during each cycle of the piston.

* * * * *